(12) United States Patent
Samanos

(10) Patent No.: US 6,576,050 B1
(45) Date of Patent: *Jun. 10, 2003

(54) METHOD FOR PREPARING A BITUMEN EMULSION, CORRESPONDING BITUMEN EMULSION AND USE THEREOF

(75) Inventor: Jacques Samanos, Villecresnes (FR)

(73) Assignee: Colas, Boulogne Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/462,358
(22) PCT Filed: May 7, 1999
(86) PCT No.: PCT/FR99/01093
§ 371 (c)(1), (2), (4) Date: Jan. 7, 2000
(87) PCT Pub. No.: WO99/57199
PCT Pub. Date: Nov. 11, 1999

(30) Foreign Application Priority Data

May 7, 1998 (FR) .............................. 98 05842

(51) Int. Cl.⁷ .................. C08L 95/00; C09D 195/00
(52) U.S. Cl. ...................................................... 106/277
(58) Field of Search ........................................ 106/277

(56) References Cited

U.S. PATENT DOCUMENTS 5,503,871 A * 4/1996 Blacklidge et al. .......... 427/138
5,670,087 A * 9/1997 Chirinos et al. .......... 252/311.5

FOREIGN PATENT DOCUMENTS

FR 2 505 851 11/1982

* cited by examiner

Primary Examiner—David Brunsman
(74) Attorney, Agent, or Firm—Sughrue Mion, PLLC

(57) ABSTRACT

The present invention relates to a process for the manufacture of an emulsion of bituminous binder, comprising a) the preparation of a concentrated primary emulsion containing a surfactant and at least 65% by weight in the case of an anionic emulsion, or at least 70% by weight in the case of the other emulsions, of bituminous binder, by mixing an initial aqueous phase and a liquid bituminous phase under the effect of a mechanical shear energy and in the presence of the said surfactant; and b) the addition of an aqueous dilution phase to the said primary emulsion.

20 Claims, 1 Drawing Sheet

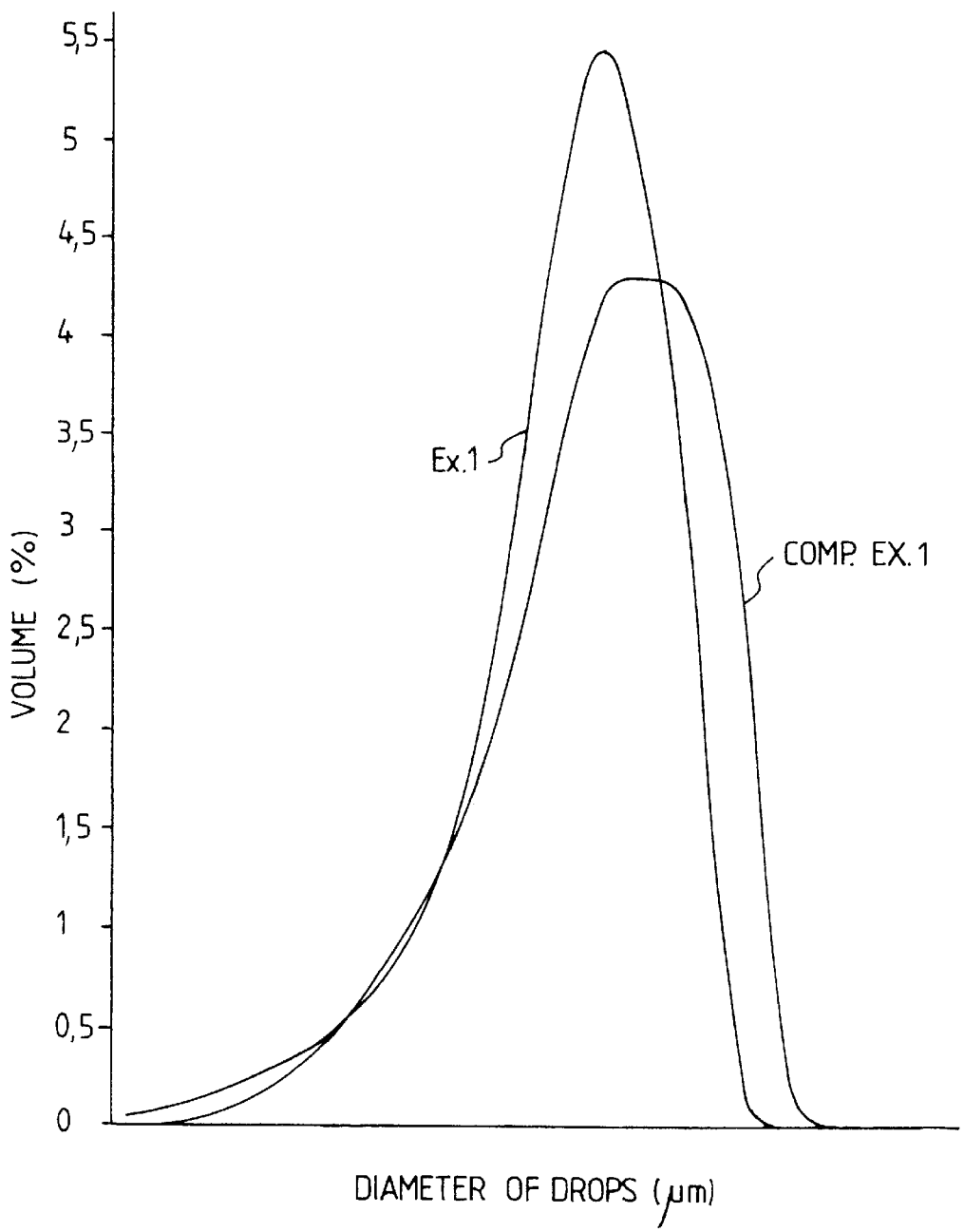

METHOD FOR PREPARING A BITUMEN EMULSION, CORRESPONDING BITUMEN EMULSION AND USE THEREOF

DESCRIPTION OF THE INVENTION

This is a 371 of PCT/FR99/01093 filed May 7, 1999.

The invention relates to a process for preparing emulsions of bituminous binder which can be used in all the applications of bitumen emulsions, including the construction and maintenance of the road surfaces as well as the construction and building industry.

The invention also relates to the emulsions prepared according to the process of the invention.

Emulsions of bituminous binder are conventionally prepared by mixing a dispersed phase and a dispersing phase in a suitable mixer. The dispersed phase can consist either of pure bitumen or of a bitumen mixed with a flux, a fluidizing agent and/or an elastomer, i.e. a modified bitumen. The dispersing phase comprises, in particular, water and various emulsifiers or surfactants. Examples of mixers which may be mentioned are colloidal mills and static mixers.

More generally, mixers which are suitable produce a shear of phases present during mixing.

As a variant, it is also known practice to add the surfactant or an additional surfactant to the dispersed phase.

When the surfactant used for manufacturing the emulsion is cationic or nonionic, the emulsion generally contains from 50 to 70% by weight of bituminous binder. When the surfactant used is anionic, the concentration of binder in the emulsion is typically from 50 to 65% by weight. The emulsions obtained from anionic surfactants are usually finer and more viscous than those comprising cationic surfactants.

According to the process of the prior art, it is possible, by varying the nature and amount of surfactant used, to control the stability of the emulsion, i.e. both its stability on storage and its stability with respect to breaking.

More specifically, it is known in the art that by increasing the amount of emulsifier, it is possible to slow down the breaking of the emulsion and to increase its stability on storage.

However, the amount of emulsifier added also has an influence on the particle size of the resulting emulsion and on its viscosity, such that, according to the prior art, a compromise must be accepted in order to optimize the rate of breaking of the emulsion, its viscosity and the properties associated with the fineness of the emulsion.

The process of the invention allows better control of the rate of breaking almost independently of the viscosity and the particle size distribution of the emulsion.

SUMMARY OF THE INVENTION

The emulsions of the invention have a higher viscosity than the emulsions of the same formulation obtained according to the processes of the prior art. Viscous emulsions are particularly desirable for certain applications, such as the preparation of surface dressings (chipseals) which need to be applied to roads with a high slope or a high crossfall (superelevation).

Unexpectedly, the inventors have realized that the process of the invention results in the preparation of emulsions which have a narrower size distribution of the droplets in the dispersed phase (referred to as the granulometric distribution hereinbelow) and thus a higher viscosity. The other advantages of the process of the invention will readily become apparent to a person skilled in the art on reading the present description.

More specifically, the process of the invention comprises:

a) the preparation of a concentrated primary emulsion containing a surfactant and at least 65% by weight in the case of an anionic emulsion, or at least 70% by weight in the case of the other emulsions, of bituminous binder, by mixing an initial aqueous phase and a liquid bituminous phase under the effect of a mechanical shear energy and in the presence of the said surfactant; and b) the addition of an aqueous dilution phase to the said primary emulsion.

The emulsions prepared according to the process of the invention have a higher viscosity than that of a corresponding emulsion of the same formulation, obtained by mixing an aqueous phase and a bituminous phase under the effect of the same mechanical shear energy as used for the preparation of the primary emulsion. Generally, the viscosity is at least 20% higher than that of the corresponding emulsion.

According to the invention, the expression "bituminous binder" means direct distillation, de-asphalting or oxidized bitumens, in pure, fluidized or fluxed form. As is known, hydrocarbon-based binders can be fluidized with light petroleum solvents such as kerosene, and fluxed with oils from coal or from petroleum. Other examples of bituminous binders which may also be mentioned are acidic bitumens such as naphthenic acid derivatives. These same binders can be used in a form modified by adding one or more polymers, organic resins or recycled rubber crumbs.

The primary emulsion is prepared in a manner which is known per se by mixing, under shear, an initial aqueous phase with a liquid bituminous phase containing the bituminous binder, in the presence of a surfactant.

DETAILED DESCRIPTION OF THE INVENTION

The mixing under shear can be performed in the conventional mixers used in the art for the preparation of bitumen emulsions. This type of mixture can be prepared using colloidal mills, turbomixers, pumps or the like or alternatively using static mixers.

When the mixing is carried out continuously, the aqueous phase and the liquid bituminous phase are introduced in proportions which allow direct production of the desired concentration for the primary emulsion.

The mixing can also be performed in a batchwise manner by gradual enrichment of the initial aqueous phase, maintained under mechanical stirring in a suitable mixer, with liquid bituminous phase until the desired concentration for the primary emulsion is obtained.

The primary emulsion can be a direct emulsion (oil-in-water emulsion) or a reverse emulsion (water-in-oil emulsion).

The temperature at which the bituminous phase is introduced into the mixer is sufficient to maintain the bituminous binder in the liquid state. A temperature above 100° C. is generally necessary.

A person skilled in the art will take care to ensure that the primary emulsion does not start boiling when it leaves the mixer.

To this end, it is convenient to adjust the respective temperatures of the aqueous phase and the bituminous phase which have to be introduced into the mixer and, if need be, to carry out the mixing under pressure.

As a guide, a temperature between room temperature and 70° C. is generally suitable for the initial aqueous phase.

The primary emulsion is either anionic (and in this case it is prepared in the presence of an anionic surfactant) or cationic (in which case the surfactant is cationic), or alternatively nonionic (when the surfactant is nonionic). Cationic emulsions are preferred in the context of the invention.

According to the invention, it is possible to envisage the preparation of any other type of primary emulsion, for example a primary emulsion prepared using a zwitterionic surfactant.

The surfactants which can be used according to the invention are those generally used in the art for the preparation of a bitumen emulsion and can be cationic, anionic, nonionic or zwitterionic.

The surfactant can be added to the initial aqueous phase, to the bituminous phase or partly to each of these two phases.

As a general rule, all of the surfactant is added to the initial aqueous phase. However, addition of all or some of the said surfactant to the bituminous phase during the preparation of the primary emulsion leads to a finer particle size of the primary emulsion, i.e. the average diameter of the droplets of the primary emulsion is smaller than when all of the surfactant is present in the aqueous phase.

The amount of surfactant which needs to be used during the preparation of the primary emulsion will readily be determined by a person skilled in the art depending on the final use for which the bituminous binder emulsion is intended.

However, as a guide, it may be noted that an amount of surfactant of less than 20 kg per tonne of primary emulsion is generally sufficient.

When the surfactant is cationic, an amount of surfactant of from 0.5 to 10 kg/t is normally suitable.

More generally, when measuring out the surfactant, a person skilled in the art will take into account the desired stability properties of the final emulsion, the desired rate of breaking and the nature of the surfactant.

However, it will be noted that, according to the invention, the surfactant can be included directly in the actual structure of the bituminous binder. This is particularly the case for acidic bitumens of the naphthenic acid type which comprise functions with emulsifying activity in their structure. In this case, the presence of an additional surfactant in one of the two phases is not necessary during the preparation of the primary emulsion. The addition of an organic or inorganic base to the initial aqueous phase is then sufficient.

The respective amounts of initial aqueous phase and bituminous phase to be mixed for the preparation of the primary emulsion depend on the desired concentration of bituminous binder in the primary emulsion.

When the primary emulsion is a cationic, nonionic or zwitterionic emulsion, the binder concentration in the primary emulsion is at least 70% by weight, preferably greater than 70% by weight, in particular between 72 and 97% by weight, better still between 75 and 97% by weight, for example between 80 and 95% by weight.

When the primary emulsion is anionic, the binder concentration in the primary emulsion is at least 65% by weight, preferably between 65 and 97% by weight, in particular greater than 70%, better still between 70 and 95% by weight, for example between 72 and 90%.

According to the invention, it is essential to dilute the primary emulsion by adding an aqueous phase.

The dilution essentially does not change either the particle size distribution or the average diameter of the droplets in the primary emulsion. In addition, it gives a direct emulsion (oil-in-water emulsion).

The addition of the aqueous phase can be carried out in a continuous or batchwise manner. Depending on the case, the process of the invention is carried out in a continuous or batchwise manner. The method used for carrying out the dilution is not essential according to the invention.

A simple way of carrying out the dilution while working continuously is to unite two convergent flows, one consisting of the aqueous dilution phase, the other consisting of the primary emulsion.

When the process is performed in a batchwise manner, the aqueous dilution phase is introduced into the primary emulsion which is kept stirring.

The temperature of the aqueous dilution phase is advantageously less than 100° C., preferably less than 50° C., for example between 18 and 25° C.

In a particularly advantageous manner, the dilution is carried out immediately after formation of the primary emulsion (i.e. without intermediate storage of the primary emulsion), in which case it is advantageous to use the aqueous dilution phase to cool the primary emulsion, if necessary.

According to another embodiment of the invention, it is possible to store the primary emulsion before dilution. For this storage, it is essential to avoid excessively low temperatures which might result in the emulsion freezing (and thus breaking). Hence, a suitable storage temperature is between 70 and 95° C., or higher, provided that the storage pressure is adapted to avoid boiling.

The amount of aqueous dilution phase which needs to be added depends on the desired binder concentration for the final emulsion.

Generally, when the primary emulsion is cationic or nonionic, the final binder concentration in the emulsion will be from 50 to 70% by weight, preferably from 60 to 70%.

On the other hand, when the primary emulsion is anionic, a final binder concentration in the emulsion of between 50 and 65% by weight will be preferred.

When it is desired to prepare a bitumen emulsion which has a high rate of breaking, it is recommended to select an aqueous dilution phase free of surfactant in order to carry out the process of the invention.

As a variant, the aqueous dilution phase of the invention can contain an additional surfactant. In this case, the rate of breaking is lower.

This surfactant can be anionic, cationic, nonionic or zwitterionic, provided that it is compatible with the surfactant of the primary emulsion.

It is also possible to modify certain characteristics of the emulsion, such as the stability of the emulsion, the rate of breaking and the viscosity, by addition of one or more other additional aqueous phases to the emulsion thus obtained, each additional aqueous phase containing one or more additional surfactants. In this case also, the condition of compatibility between the various surfactants must be ascertained.

The total amount of surfactant present in the emulsion is a parameter which has an influence on some of the properties of the emulsion, such as its stability. Consequently, the amount of additional surfactants will be adjusted depending on the final use of the emulsion.

Nevertheless, as a general rule, the total amount of surfactant will not exceed 20 kg per tonne of emulsion, and, in the case of cationic surfactants, will not exceed 10 kg/t.

When the emulsion of bituminous binder is intended for the maintenance of road surfaces, the final emulsion preferably contains from 0.05 to 1.5% by weight, better still from 0.1 to 1% by weight, of surfactant.

As additional constituents, the aqueous dilution phase, the initial aqueous phase and/or the liquid bituminous phase can contain the usual additives used in the art, and in particular various solvents and/or polymers such as those which promote the adhesion or "bonding" of the emulsion, i.e. the ability of the emulsion to come into contact with the bodies present, such as gravel and granulates.

Other additives are stabilizers, antifreezes, thickeners or natural or synthetic latices, which are preferably added to the initial aqueous phase or to the aqueous dilution phase.

Examples of synthetic latices are an SBS (styrene-butadiene-styrene) latex, an SBR (styrene-butadiene rubber) latex and a polychloroprene latex. It will be noted in this respect that the addition of latex to the aqueous phase is usually carried out during the use of unmodified bituminous binder.

When the dilution is obtained by addition of one or more additional aqueous phases, it should be understood that each of these phases can contain such additives.

The result of this is that one advantage of the process of the invention is that, by virtue of the dilution step, it is possible to give the final emulsion specific properties by addition of suitable additives. Such a freedom of operation was not possible in the case of the conventional preparation processes, in which all of the constituents of the emulsion are added initially.

According to another of its aspects, the invention relates to the emulsions prepared according to the process of the invention.

The invention also relates to a direct cationic emulsion intended for the preparation of surface dressings (chipseals), comprising less than 70% by weight of bituminous binder, characterized in that it has a breaking index of not more than 90 (as measured according to French standard NFT 66-017) and a granulometric distribution, defined by an average diameter of the droplets in the dispersed phase, of less than about 8 μm and a standard deviation of not more than 0.32.

The emulsions of the invention can be used in a variety of industrial applications, such as the construction and maintenance of road surfaces and the building industry.

They can be used in particular for the preparation of surface coatings, attachment layers or curing layers, surfacings, emulsion base courses, bituminous slurries or cold-cast surfacings, or alternatively to ensure the leaktightness of foundations.

According to the process of the invention, it is possible to independently control the particle size of the emulsion and the viscosity (or the particle size distribution). The reason for this is that, according to the invention, the viscosity of the final emulsion depends mainly on the concentration of bituminous binder in the primary emulsion, whereas the nature and amount of surfactant contained in the primary emulsion mainly have an influence on the particle size of the emulsion.

In addition, the process of the invention allows improved control of the rate of breaking, independently or almost independently of the amount and nature of the emulsifier initially present in the primary emulsion. This control is achieved by adding additional surfactants or stabilizers to the aqueous dilution phase.

Another advantage of the process of the invention is that it leads to an increase in the production capacity of conventional emulsion manufacturing plants on account of the final dilution.

Finally, it will be noted that the process of the invention can be carried out on conventional plants designed for the manufacture of bitumen emulsions by means of minor modifications to allow the dilution of the primary emulsion.

The emulsion of the invention can be stored before use. It will preferably be maintained at a temperature of between 20 and 70° C. Advantageously, the emulsion is stored at a temperature from 40 to 50° C. by insulating the storage containers.

The examples below are given by way of illustration. They describe emulsions which are particularly suitable for the preparation of surface coatings.

EXAMPLE 1

An emulsion containing 65% bituminous binder is prepared according to the process of the invention. The mixer used is a colloidal mill (referred to as a mill of type A hereinbelow).

The primary emulsion is prepared by direct mixing of 800 kg of 180/220 bitumen at 130° C. and of an initial aqueous phase at 50° C. containing 1.85 kg of an emulsifier of the alkyltrimethylenediamine tallow type (Dinoram® S), 1.6 kg of 32% hydrochloric acid and 200 kg of water.

Next, on leaving the colloidal mill, the primary emulsion is diluted with 230 kg of water at room temperature (≈20° C).

The resulting emulsion comprises 1.5 kg of emulsifier per tonne of emulsion and 1.3 kg of hydrochloric acid per tonne of emulsion.

The characteristics of the resulting dilute emulsion are given in Table 1, it being understood that the break index is measured in accordance with French standard NFT 66-017 and the STV viscosity is measured in accordance with French standard NFT 66-005 using the container whose orifice is 4 mm in diameter. In addition, the granulometric distribution of the droplets in the dispersed phase was obtained directly using a Coulter counter.

COMPARATIVE EXAMPLE 1

By way of comparison, an emulsion containing 65% bituminous binder is prepared from the same ingredients using the standard process which consists in introducing the bituminous phase (180/220 bitumen) at 130° C. and the aqueous phase at 50° C. into a colloidal mill, in proportions which give the desired binder concentration directly. The mill used is a colloidal mill of type A used in Example 1. The respective amounts of the constituents of the emulsion are as follows:

| | |
|---|---|
| 180/220 bitumen: | 650 kg |
| Dinoram ® S: | 1.5 kg |
| 32% HCl: | 1.3 kg |
| water: | 347.20 kg |
| Total | 1000 kg |

The characteristics of the emulsion thus prepared were measured under the same conditions as those of Example 1. They are given in Table 1.

TABLE 1

| | Emulsion | |
|---|---|---|
| Characteristics | Example 1 | Comparative Example 1 |
| Retainings at 630 μm (%)[(1)] | 0.01 | 0.07 |
| Retaining at 160 μm (%)[(2)] | 0.02 | 0.13 |
| Water content (%) | 34.1 | 34.2 |
| pH | 2.8 | 2.8 |
| Break index | 71 | 78 |
| STV viscosity (s) | 21 | 9 |

TABLE 1-continued

| | Emulsion | |
|---|---|---|
| Characteristics | Example 1 | Comparative Example 1 |
| Average diameter of the droplets of the dispersed phase | 4.0 | 4.9 |
| Standard deviation[3] | 0.32 | 0.38 |

[1]The retainings at 630 μm is the percentage of particles retained by a screen which stops particles with a diameter greater than or equal to 630 μm.
[2]The retainings at 160 μm is the percentage of particles retained by a screen which stops particles with a diameter greater than or equal to 160 μm.
[3]The standard deviation is a characteristic of the granulometric distribution. It is given by the equation SD = −0.5 log ($D_{16} \cdot D_{84}$) in which SD is the standard deviation, $D_{16}$ is the diameter of the droplets at 16% fines and $D_{84}$ is the diameter of the droplets at 84% fines.

BRIEF DESCRIPTION OF THE DRAWING

The granulometric distributions obtained in the case of Example 1 and Comparative Example 1 are represented in FIG. 1.

In this FIG. 1, the y-axis corresponds to the volume occupied by the droplets (as a percentage relative to the total volume of the emulsion) and the x-axis corresponds to the droplet diameter of the dispersed phase (in μm). The smaller the standard deviation of the granulometric distribution, the narrower the distribution.

It results from Table 1 and FIG. 1 that the emulsion prepared according to the process of the invention (Ex. 1) has a narrower particle size distribution than the emulsion of Comparative Example 1 (cf. standard deviation and FIG. 1). Similarly, it is observed that the emulsion of the invention is characterized by a larger viscosity and a smaller average diameter (arithmetic mean). It is moreover noted that the percentage of large droplets has been reduced by using the process of the invention (cf. the retainings values). Moreover, it is easy to see that, in the case of the emulsion of the invention, the breaking index obtained is smaller.

EXAMPLE 2

Using the procedure of Example 1, but with a different model of colloidal mill (referred to as a colloidal mill of type B hereinbelow) and starting with the following amounts of constituents, an emulsion containing 65% bituminous binder in accordance with the invention is prepared.

| a) Primary emulsion | |
|---|---|
| bituminous phase at 125° C.: | |
| fluxed 180/220 bitumen (comprising 2.3% flux): | 900 kg |
| initial aqueous phase at 37° C.: | |
| emulsifier of alkylamido-amine type: | 2.1 kg |
| 32% hydrochloric acid: | 1.94 kg |
| water: | 96.0 kg |
| b) Dilute emulsion: | |
| dilution water at 20° C.: | 384.7 kg |

It will be noted that the emulsifier content of this emulsion is 1.5 kg per tonne of emulsion and its content of 32% hydrochloric acid is 1.4 kg per tonne of emulsion.

COMPARATIVE EXAMPLE 2

In accordance with the procedure of Comparative Example 1, but using the colloidal mill of type B, an emulsion containing 65% bituminous binder is prepared from the following ingredients:

| | |
|---|---|
| fluxed 180/220 bitumen (comprising 2.3% flux): | 650 kg |
| emulsifier of alkylamido-amine type: | 1.5 kg |
| 32% hydrochloric acid: | 1.4 kg |
| water: | 347.1 kg |
| Total | 1000 kg |

EXAMPLE 3

Using the procedure of Example 2, an emulsion containing 69% bituminous binder in accordance with the invention is prepared from the following constituents:

| a) Primary emulsion: | |
|---|---|
| bituminous phase at 125° C.: | |
| fluxed 180/220 bitumen (comprising 2.17% flux): | 850 kg |
| initial aqueous phase at 37° C.: | |
| emulsifier of alkylamidoamine type: | 2.09 kg |
| 32% HCl: | 1.85 kg |
| water: | 146.1 kg |
| b) Dilute emulsion: | |
| dilution water at 20° C.: | 231.8 kg |

EXAMPLE 4

Using the procedure of Example 2, an emulsion containing 69% bituminous binder in accordance with the invention is prepared from the following constituents:

| a) Primary emulsion: | |
|---|---|
| bituminous phase at 125° C.: | |
| fluxed 180/220 bitumen (comprising 2.17% flux): | 900 kg |
| initial aqueous phase at 37° C.: | |
| emulsifier of alkylamidoamine type: | 2.22 kg |
| 32% HCl: | 1.95 kg |
| water: | 95.8 kg |
| Dilute emulsion: | |
| dilution water at 20° C.: | 304.4 kg |

The emulsifier content of the emulsions of Examples 3 and 4 is 1.7 kg per tonne of emulsion and their content of 32% hydrochloric acid is 1.5 kg per tonne of emulsion.

COMPARATIVE EXAMPLE 3

In accordance with the procedure of Comparative Example 1, but using the colloidal mill of type B, an emulsion containing 69% bituminous binder is prepared from the following ingredients:

| | |
|---|---|
| fluxed 180/220 bitumen (comprising 2.17% flux): | 690 kg |

-continued

| | |
|---|---|
| emulsifier of alkylamido-amine type: | 1.7 kg |
| 32% hydrochloric acid: | 1.5 kg |
| water: | 306.8 kg |
| Total | 1000 kg |

Table 2 summarizes the characteristics of the emulsions prepared in Examples 2 to 4 and in Comparative Examples 2 and 3.

The various parameters are measured under the same conditions as in Example 1.

TABLE 2

| | Examples | | | | |
|---|---|---|---|---|---|
| Characteristics | Example 2 | Comparative Example 2 | Example 3 | Example 4 | Comparative Example 3 |
| Water content (kg) | 353 | 353 | 312 | 315 | 311 |
| Breaking index | 69 | 81 | 89 | 69 | 83 |
| STV viscosity (s) | 21 | 8 | 375[1] | 554[1] | 133 |
| Average diameter of the droplets of the dispersed phase ($\mu$m) | 6.2 | 8.8 | 7.5 | 5.9 | 8.5 |
| Standard deviation | 0.29 | 0.33 | 0.30 | 0.28 | 0.33 |

[1] The STV viscosity measurement was carried out according to French standard NFT 66-005, but using the container whose orifice is 10 mm in diameter.

This table confirms that, for an equal concentration of bituminous binder in the final emulsion, the emulsions of the invention have a narrower granulometric distribution and thus a higher viscosity. This results in particular from a comparison of the emulsion of Example 2 with the emulsion of Comparative Example 2 as well as a comparison of the emulsion of Comparative Example 3 with the emulsions of Examples 3 and 4 in accordance with the invention.

What is claimed is:

1. A process for manufacture of an emulsion of bituminous binder having a viscosity greater than that of a corresponding emulsion, of the same formulation, obtained by mixing an aqueous phase and a bituminous phase under the effect of the same shear energy, said process comprising:
   a) preparing a concentrated primary emulsion containing a surfactant and at least 65% by weight in the case of an anionic emulsion, or at least 70% by weight in the case of the other emulsions, of bituminous binder, by mixing an initial aqueous phase and a liquid bituminous phase under the effect of a mechanical shear energy and in the presence of said surfactant, wherein the mixing is carried out continuously; and
   b) adding an aqueous dilution phase to said primary emulsion.

2. Process according to claim 1, characterized in that, in step a), all of the said surfactant is present in the said initial aqueous phase.

3. Process according to claim 1, characterized in that, in step a), the said surfactant is completely or partly present in the said liquid bituminous phase.

4. Process according to claim 1, characterized in that, in step a), the said surfactant is a cationic surfactant.

5. Process according to claim 4, characterized in that, in step a), the amount of initial aqueous phase is such that it gives a primary emulsion containing from 75 to 97% by weight of bituminous binder.

6. Process according to claim 4, wherein, in step b), the amount of aqueous dilution phase is such that it gives an emulsion containing from 50 to 70% by weight of bituminous binder.

7. Process according to claim 1, characterized in that the initial aqueous phase also comprises a natural or synthetic latex and in that the bituminous binder is an unmodified bituminous binder.

8. Process according to claim 1, characterized in that step b) is performed without intermediate storage of the primary emulsion.

9. Process according to claim 1, characterized in that, in step b), the said aqueous dilution phase comprises no surfactant.

10. Process according to claim 1, characterized in that, in step b), the said aqueous dilution phase comprises an additional surfactant which is compatible with the surfactant used during the preparation of the primary emulsion.

11. Process according to claim 1, characterized in that, in step b), the temperature of the aqueous dilution phase is from 20 to 50° C.

12. Process according to claim 1, characterized in that it comprises the additional step which consists in again diluting the emulsion obtained, by adding one or more additional aqueous dilution phases.

13. Process according to claim 12, characterized in that each additional aqueous dilution phase comprises one or more additional surfactants.

14. Process according to claim 12, characterized in that each additional aqueous phase comprises one or more additives selected from the group consisting of antifreezes, stabilizers, thickeners and natural or synthetic latices.

15. Emulsion of bituminous binder prepared according to the process of claim 1.

16. The process according to claim 1, wherein, in step (a), the mixing is carried out starting from a liquid bituminous phase having a temperature equal to or greater than 125° C.

17. The process according to claim 1, wherein, in step (a), the mixing is carried out starting from a liquid bituminous phase having a temperature of between 125° and 130° C.

18. The process according to claim 1, wherein the continuous mixing under shear of step a) is performed by using a conventional continuous mixer selected from the group consisting of a colloidal mill, a turbomixer, a pump and a static mixer, in which the aqueous phase and the liquid bituminous phase are introduced.

19. The process according to claim 1, wherein the dilution of step (b) is carried out in a continuous way.

20. The process according to claim 1, wherein the dilution of step (b) is performed by uniting two convergent flows, one consisting of the aqueous dilution phase, the other consisting of the primary emulsion.

* * * * *